(12) United States Patent
Esumi

(10) Patent No.: US 9,807,279 B2
(45) Date of Patent: Oct. 31, 2017

(54) IMAGE FORMING APPARATUS

(71) Applicant: Konica Minolta, Inc., Chiyoda-ku, Tokyo (JP)

(72) Inventor: Yoshihiro Esumi, Tokyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/215,065

(22) Filed: Jul. 20, 2016

(65) Prior Publication Data

US 2017/0026547 A1    Jan. 26, 2017

(30) Foreign Application Priority Data

Jul. 23, 2015  (JP) ................................ 2015-146012

(51) Int. Cl.
| | | |
|---|---|---|
| G03G 15/00 | (2006.01) | |
| H04N 1/40 | (2006.01) | |
| H04N 1/06 | (2006.01) | |
| G03G 15/043 | (2006.01) | |

(52) U.S. Cl.
CPC ....... H04N 1/40037 (2013.01); G03G 15/043 (2013.01); H04N 1/06 (2013.01); H04N 2201/0091 (2013.01)

(58) Field of Classification Search
CPC ............... G03G 15/556; G03G 15/043; G03G 15/0266; H04N 1/06; H04N 1/401

USPC ............................................................ 399/4
See application file for complete search history.

(56) References Cited

U.S. PATENT DOCUMENTS

| | | | | |
|---|---|---|---|---|
| 2006/0077193 A1* | 4/2006 | Thielemans | .............. | G06F 3/14 345/204 |
| 2010/0103442 A1* | 4/2010 | Saiki | .................... | G06K 15/129 358/1.9 |

FOREIGN PATENT DOCUMENTS

| | | |
|---|---|---|
| JP | 2004-050789 A | 2/2004 |
| JP | 2009-292058 A | 12/2009 |

* cited by examiner

*Primary Examiner* — Walter L Lindsay, Jr.
*Assistant Examiner* — Jessica L Eley
(74) *Attorney, Agent, or Firm* — Buchanan Ingersoll & Rooney PC

(57) ABSTRACT

Provided is an image forming apparatus outputs for each pixel, together with the pixel data, pixel position data which adjusts an irradiation position for each pixel of the laser light in a range of one pixel in a scanning direction, generates a pulse width signal at a pixel position corresponding to the pixel position data and having a pulse width corresponding to the pixel data, generates the laser light based on the pulse width signal, and corrects, via the adjustment by the pixel position data, the pulse widths of the pulse width signals to different values depending on whether the pulse width signals of the adjacent two pixels contact with each other.

6 Claims, 9 Drawing Sheets

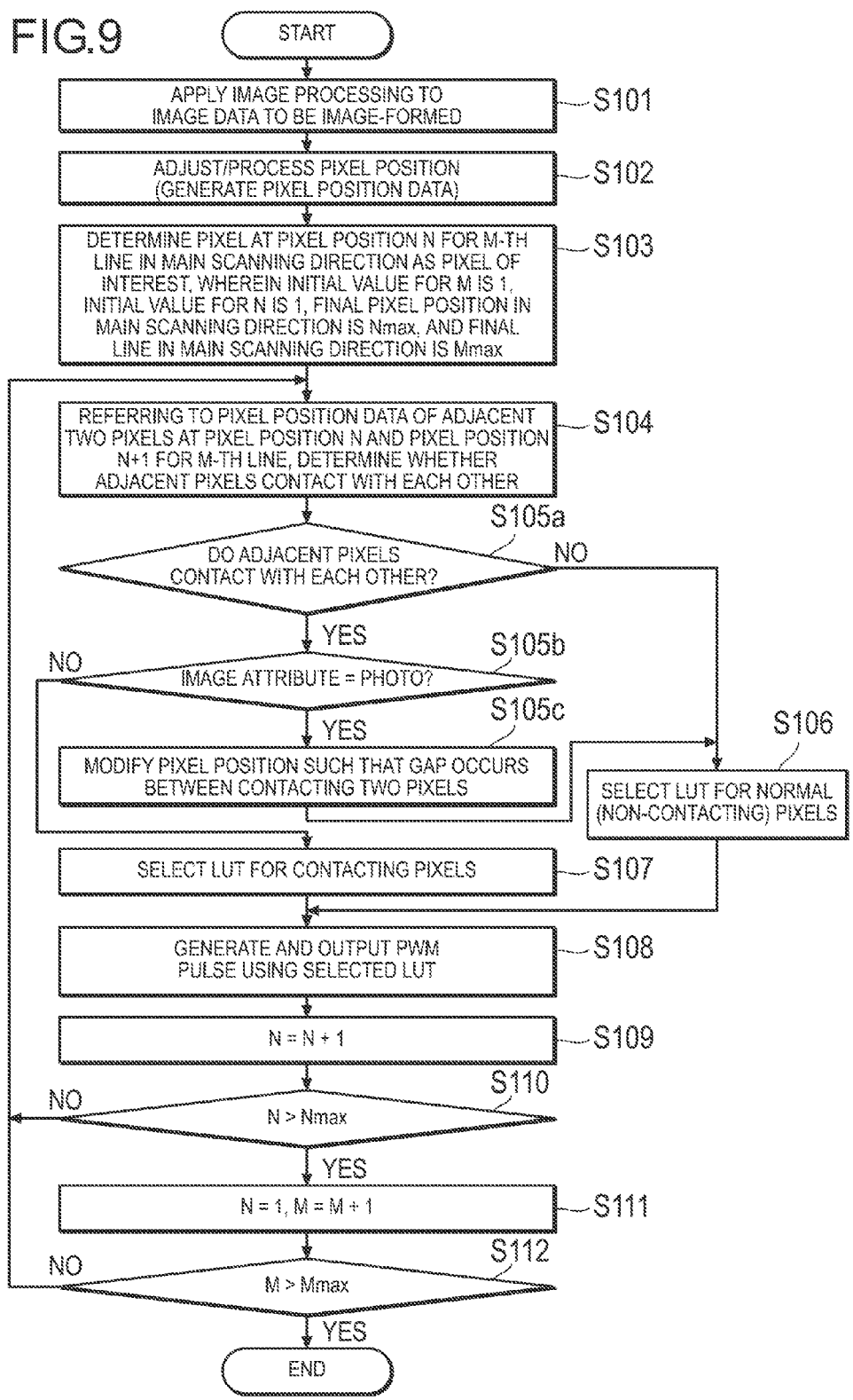

| PIXEL DATA | 16 | 16 |
|---|---|---|
| PIXEL POSITION DATA | RIGHT JUSTIFIED | LEFT JUSTIFIED |
| PULSE CONTACT | YES | YES |
| PWM DUTY CYCLE | 10% | 10% |

(b)

| PIXEL DATA | 16 | 16 |
|---|---|---|
| PIXEL POSITION DATA | RIGHT JUSTIFIED (RIGHT NON-CONTACT FINE ADJUSTMENT) | LEFT JUSTIFIED (LEFT NON-CONTACT FINE ADJUSTMENT) |
| PULSE CONTACT | YES → NO | YES → NO |
| PWM DUTY CYCLE | 10% → 15% | 10% → 15% |

FIG.11

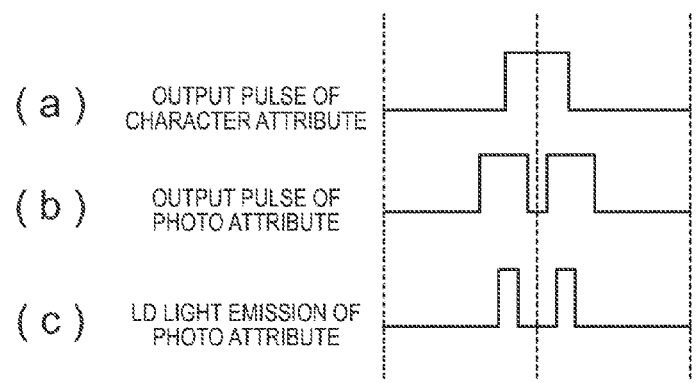

(a) OUTPUT PULSE OF CHARACTER ATTRIBUTE (b) OUTPUT PULSE OF PHOTO ATTRIBUTE (c) LD LIGHT EMISSION OF PHOTO ATTRIBUTE

IMAGE FORMING APPARATUS

CROSS-REFERENCE TO RELATED APPLICATION

This application is based on Japanese Patent Application No. 2015-146012 filed on Jul. 23, 2015, the contents of which are incorporated herein by reference.

BACKGROUND

1. Technical Field

The present invention relates to an electrophotographic image forming apparatus, and more particularly pertains to the control of an image forming apparatus in which multi-value image data is reproduced by pulse-width modulation of laser light.

2. Description of Related Art

There has been known an image forming apparatus that forms a two-dimensional (one-page) image by repetitively performing image formation for one or a plurality of lines in a first direction (main scanning direction) corresponding to image data, while driving an image carrier, such as a photoreceptor drum or a photoreceptor belt, in a second direction (sub-scanning direction).

By way of example, in an electrophotographic image forming apparatus, laser light modulated with image data is scanned in a main scanning direction, and concurrently therewith, an image is formed by the laser light on an image carrier (a photoreceptor drum or a photoreceptor belt), which is rotated in a sub-scanning direction.

Further, conventionally, in an image forming apparatus using laser light, use is made of a pulse width control system in which in order to represent multi-value image data including half tone as a toner image, the laser light used is pulse width modulated in correspondence to an image density (pixel data) of the image data.

In the above system, image data of each pixel is inputted to a pulse width modulator, which in turn outputs a pulse having a width corresponding to the image data. The pulse is received as an input at a laser driver in which the laser light is turned on and off at a timing of the pulse. In other words, a density gradation can be reproduced by adjusting, based on the image data, a width of the laser light scanned on a scanned object.

Meanwhile, it is known that in the image forming apparatus such as described above, in which laser light is generated by use of a pulse width modulated pulse having a predetermined width, there is a problem in that depending on the performance of a laser driver or laser diode, laser light is not generated actually when the pulse width becomes narrower than a certain value.

FIG. 4 is a characteristic view illustrating an example of the relationship between PWM duty cycle and LD light emission amount. However, the characteristic is by way of example, and may become different depending on an environment such as characteristics of elements, pixel density or the like. Focusing on the relationship between the PWM duty cycle indicated on the horizontal axis (0%-100% (ratio that the pulse becomes on within the range of one pixel)) and the LD light emission amount indicated on the vertical axis (relative indication in 10 steps of 0-10, wherein 0 is non-light emission, and 10 is maximum light emission amount), it is seen that the LD light emission amount becomes 0 when the PWM duty cycle (pulse width) becomes smaller than or equal to 10% (d0 in FIG. 4).

In this way, when the LD light emission amount is not obtained, there is a problem in which a low density image cannot be reproduced faithfully. Therefore, countermeasures have been taken such as disclosed in Japanese Patent Laid-open Publication No. 2004-50789 (Patent Document 1) and Japanese Patent Laid-open Publication No. 2009-292058 (Patent Document 2).

In the above Patent Document 1, it is devised to allow LD to emit light even at a low density by making use of an increase of the pulse width due to contact (combination) between adjacent two pixels to cause light emission.

Further, in the above Patent Document 2, a technique is proposed to correct the pulse width in view of a difference between light emission time and non-light emission time when a line in a main scanning direction and a line in a sub-scanning direction are formed in an image forming apparatus in which light emission in the main scanning direction is repeated in the sub-scanning direction. For example, for the line in the main scanning direction, a state occurs in which the LD emits light substantially continuously, so that the LD is maintained in a state that facilitates light emission. Meanwhile, for the line in sub-scanning direction, a state occurs in which light emission is performed just for a moment during continuous non-light emission in the main scanning direction. Hence, for the line in the sub-scanning direction, a control such as facilitating light emission by increasing the pulse width is required.

As disclosed also in Patent Document 1, a technique exists to cause a pulse to be either left or right justified, in addition to causing the pulse to be located centrally within the range of one pixel, in order to enhance reproducibility of a thin line or make a diagonal edge appear smooth when image formation is performed by controlling laser light per pixel via pulse-width modulation.

FIGS. 12 and 13 illustrate, for two pixels adjacent to each other in the main scanning direction, pixel data, pixel position data, pulse width (PWM duty cycle) generated based on the pixel data, output pulse shape, and LD light emission status.

According to the characteristic view of FIG. 4, the LD light emission amount is 0 when the PWM duty cycle is 10%. However, as in FIG. 12, when a right justified pixel and a left justified pixel contact with each other and the total PWM duty cycle is 20% (10%+10% in FIG. 12(a), FIG. 12(b)), an LD light emission amount according to the PWM duty cycle of 20% is generated (FIG. 12(c)).

However, when three pixels, i.e., aright justified pixel, a center justified pixel and left justified pixel exist independently without contacting with each other as in FIG. 13, the LD light emission amount remains zero (FIG. 13(c): non-light emission) even if the PWM duty cycle is 10%+10%+10% (FIG. 13 (b)).

In other words, it has been discovered by the present inventor that a reversal phenomenon (tone jump) occurs for the relationship between the pixel data and the light emission amount as in cases in which light emission is performed with pixel data of 32+32 (refer to FIG. 12) and in which light emission is not performed even with pixel data of 32+32+32 (refer to FIG. 13).

Meanwhile, there is also a technique that does not make use of a low density region in which such tone jump occurs. However, in the recent image forming apparatus, a high resolution has been achieved, and the pulse width of one pixel has become narrower than the conventional one. Therefore, it is undesirable that there is a region which cannot be used or a region in which a tone jump occurs. Further, also when achieving a high gradation in an image forming apparatus, it is undesirable that there is a region which cannot be used or a region in which a tone jump occurs.

SUMMARY

The present invention has been made to solve the above problems, and has for an object to achieve an image forming apparatus in which when performing image formation with laser light generated from a pulse with pixel position control, it is possible to generate laser light corresponding to the pulse without causing occurrence of a tone jump between pixel data and a light emission amount.

To achieve at least one of the abovementioned objects, the image forming apparatus reflecting one aspect of the present invention is an image forming apparatus in which based on pixel data for each pixel included in image data, laser light having a pulse width corresponding to the pixel data is irradiated while scanning to an image carrier, thereby forming on the image carrier an image in which density tone is reproduced, the image forming apparatus including: an image processing unit that outputs for each pixel, together with the pixel data, pixel position data which adjusts an irradiation position for each pixel of the laser light on the image carrier in a range of one pixel in a scanning direction; a PWM processing unit that generates, for the each pixel, a pulse width signal at a pixel position corresponding to the pixel position data and having a pulse width corresponding to the pixel data; a light emission drive unit that drives light emission of a laser diode based on the pulse width signal generated by the PWM processing unit, thereby generating the laser light; and a position determination unit that determines, via the adjustment by the pixel position data, whether the pulse width signals of adjacent two pixels contact with each other, wherein by referring to a result of the determination by the position determination unit, the PWM processing unit corrects the pulse widths of the pulse width signals to different values depending on whether the pulse width signals of the adjacent two pixels contact with each other.

In the above image forming apparatus, the PWM processing unit is preferably configured by including a first look-up table that converts the pixel data to the pulse widths when the pulse width signals of the adjacent two pixels do not contact with each other; and a second look-up table that converts the pixel data to the pulse widths when the pulse width signals of the adjacent two pixels contact with each other.

In the above image forming apparatus, in at least one of cases in which the pulse width signals of the adjacent two pixels contact with each other and in which the pulse width signals of the adjacent two pixels do not contact with each other, the PWM processing unit preferably determines the pulse widths by performing addition or subtraction so as to correct the pulse widths of the pulse width signal to different values.

In the above image forming apparatus, when it is determined by the position determination unit that the pulse width signals of the adjacent two pixels contact with each other, and when an attribute of the pixel data is a predetermined condition, the PWM processing unit preferably adjusts the position of at least one of the pulse width signals of the two pixels such that the pulse width signals do not contact with each other, so that each of the pulse widths is determined as the pulse width signals of the two pixels do not contact with each other.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 9 is a flow chart illustrating the operation of the image forming apparatus according to the second embodiment of the present invention.

FIG. 10 is a view illustrating characteristics of the image forming apparatus according to the second embodiment of the present invention.

FIG. 11 is a view illustrating characteristics of the image forming apparatus according to the second embodiment of the present invention.

DETAILED DESCRIPTION

Hereinafter, with reference to the drawings, a detailed description will be made of a best mode (embodiment) for practicing the present invention.

[Apparatus Configuration (1) of Embodiment]

The configuration of a major part of an image forming apparatus 100 according to a first embodiment will now be described in detail based on FIG. 1. Meanwhile, in the present embodiment, the configuration requirements, which are common and well known, in the electrophotographic image forming apparatus 100 are omitted.

Figure 1:
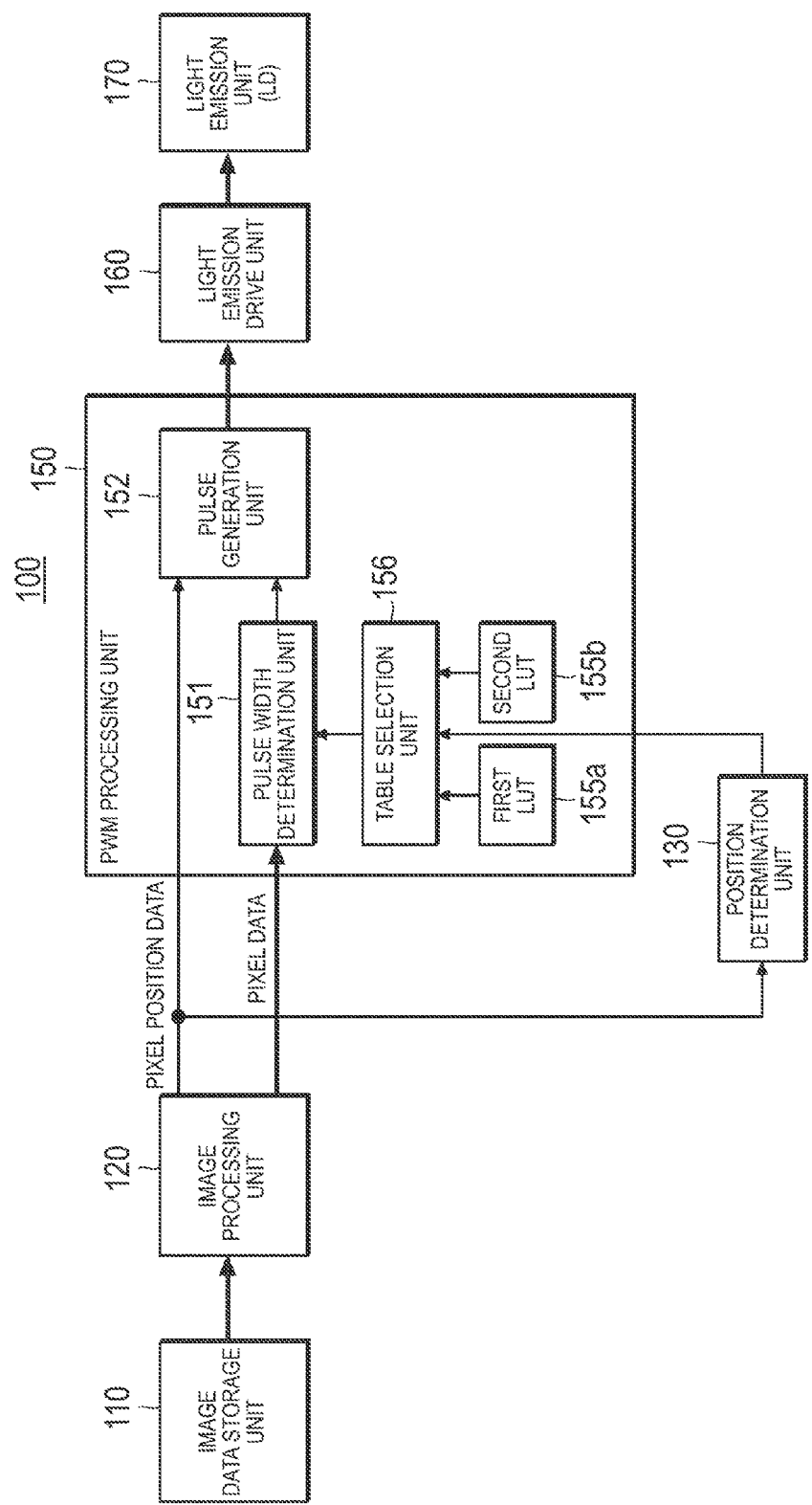
FIG. 1 is an explanatory diagram illustrating the configuration of a major part of an image forming apparatus according to a first embodiment of the present invention.

The image forming apparatus 100 illustrated in FIG. 1 is configured by including an image data storage unit 110, an image processing unit 120, a position determination unit 130, a PWM processing unit 150, a light emission drive unit 160, and a light emission unit 170.

Further, the PWM processing unit 150 is configured by including a pulse width determination unit 151, a pulse generation unit 152, a first look-up table 155a, a second look-up table 155b, and a table selection unit 156.

The image data storage unit 110 stores image data from a scanner, an external device, a print controller, or the like until image formation is initiated.

The image processing unit 120 performs image processing required for image formation with respect to image data read out of the image data storage unit 110. In the present embodiment, when pixel data for each pixel included in the image data is outputted, pixel position data required for position control of the pixel is generated, and the pixel data and the pixel position data are outputted together.

The position determination unit 130 determines, via adjustment by the pixel position data, whether pulse width signals of adjacent two pixels contact each other.

The PWM processing unit 150 generates, for each pixel, a pulse width signal at a pixel position corresponding to the pixel position data and having a pulse width corresponding to the pixel data. Then, based on the result of determination by the position determination unit 130, the table selection unit 156 selects either one of the first look-up table 155a and the second look-up table 155b. The pulse width determination unit 151 determines the pulse width by applying the pixel data to the selected look-up table. The pulse generation unit 152 in turn generates a pulse width signal at a pixel position corresponding to the pixel position data and having a pulse width corresponding to the pixel data, based on the pulse width determined by the pulse width determination unit 151 and the pixel position data.

The light emission drive unit 160 generates a drive signal for driving a light source from the pulse width signal generated by the PWM processing unit 150 with respect to the light emission unit 170 including a light source such as a laser diode (LD) or the like.

The light emission unit 170 includes a light source such as a laser diode (LD) and carries out a predetermined emission of light at a predetermined pixel position with respect to an image carrier (not illustrated) in response to the drive signal from the light emission drive unit 160.

Irradiation of a laser light corresponding to the pixel data such as described above results in an electrostatic latent image being formed on the unillustrated image carrier. The electrostatic latent image is developed by an unillustrated development unit and transformed into a toner image. The toner image on the image carrier in turn is transferred to a paper sheet by an unillustrated transfer unit. The toner image on the paper sheet is transformed into a stable image by heat and pressure of an unillustrated fixing unit.

[Operation (1) of the Embodiment]

In the following, an operation (1) of the image forming apparatus 100 according to the first embodiment will be described with reference to the flow chart of FIG. 2 and the characteristics views of FIG. 3 and succeeding figures.

Figure 2:
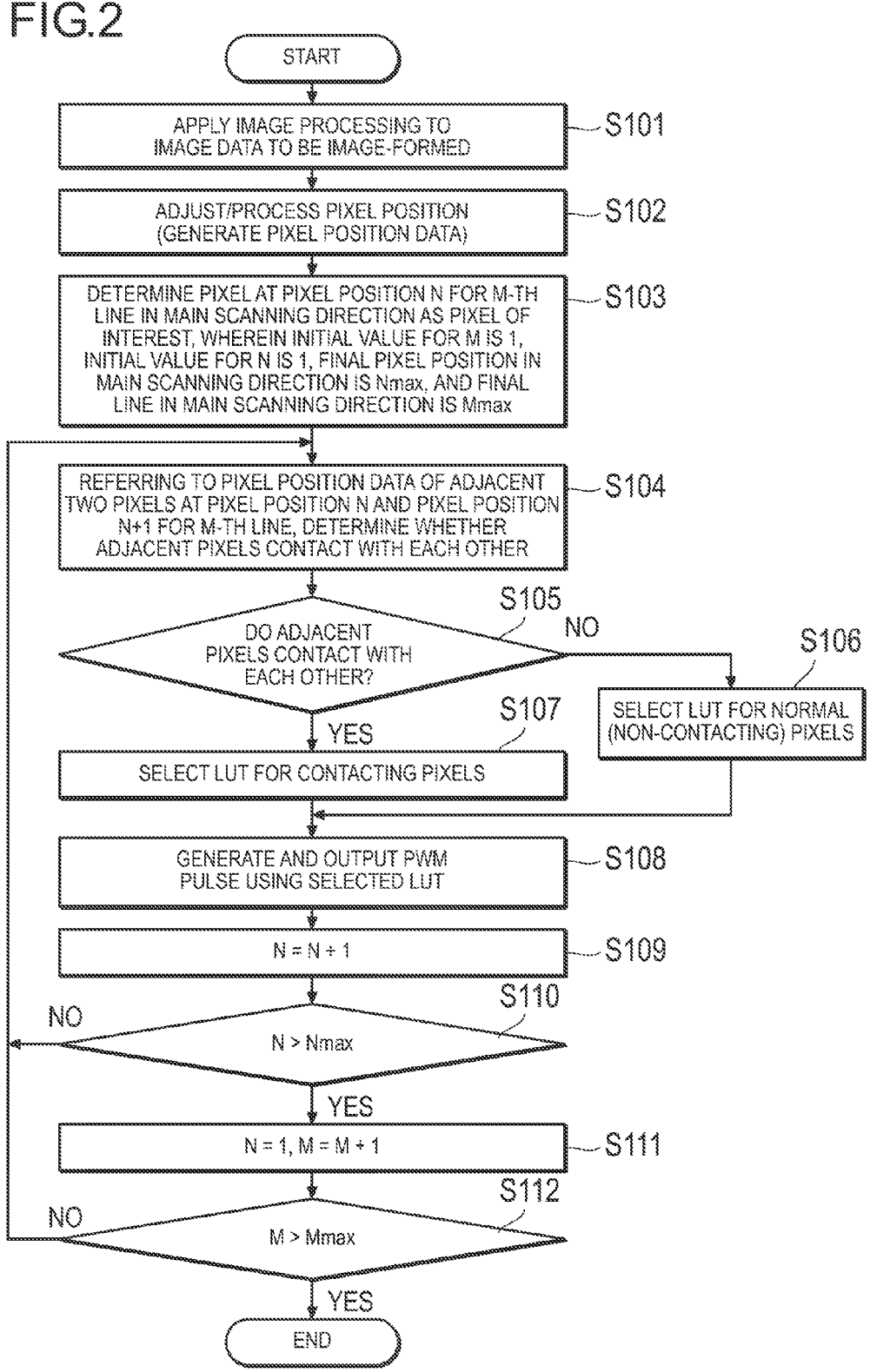
FIG. 2 is a flow chart illustrating the operation of the image forming apparatus according to the first embodiment of the present invention.

The image processing unit 120 reads out one, which constitutes a target for image formation, of the image data stored in the image data storage unit, and performs various kinds of image processing required for image formation (step S101 in FIG. 2).

Further, the image processing unit 120 generates pixel position data for each pixel by performing pixel position adjustment processing in which a position to locate a pulse (left, center, right) is controlled within the range of one pixel in order to enhance reproducibility of a thin line or make a diagonal edge appear smooth (step S102 in FIG. 2). Accordingly, a state occurs in which pixel data indicative of the pixel value of each pixel and pixel position data indicative of the formation position of each pixel are included for the image data.

Meanwhile, when repetitively performing image formation for each one line in a first direction (main scanning direction) corresponding to pixel data while driving an image carrier such as a photoreceptor drum, a photoreceptor belt or the like in a second direction (sub-scanning direction), the image forming apparatus determines a pixel of interest for the following processing, wherein: the initial value for a pixel N in the main scanning direction is 1; the final pixel in the main scanning direction is Nmax; the initial value for the order M in the sub-scanning direction of line-like image formation in the main scanning direction is 1; and the final line in the sub-scanning direction is Mmax (step S103 in FIG. 2).

By referring to pixel position data of two pixels adjacent to each other in the main scanning direction at a pixel position N and a pixel position N+1 for the M-th line in the sub-scanning direction, the position determination unit 130 determines whether the adjacent two pixels contact with each other (step S104 in FIG. 2).

A continued description will be given assuming that the main scanning direction is a horizontal direction (left-to-right direction), that the sub-scanning direction is a vertical direction (up-to-down direction), and that the scanning of laser light on the image carrier is performed from left to right. The above term "left-to-right" refers to a relative position expression.

Figure 12:
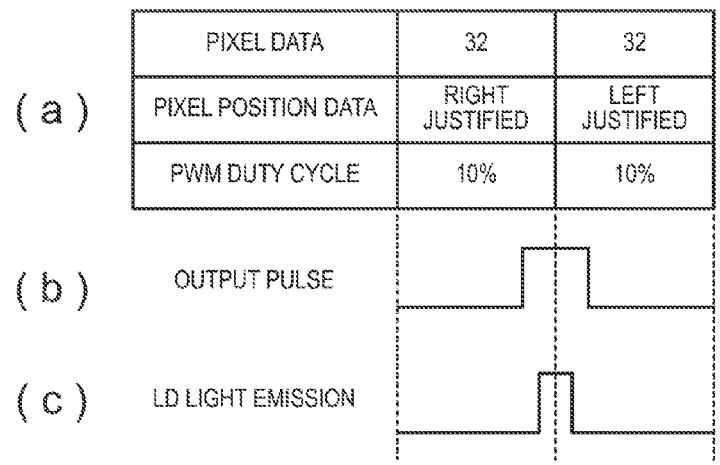
FIG. 12 is a view illustrating characteristics of a conventional image forming apparatus.

When the pixel position data at the pixel position N is right-justified and the pixel position data at the pixel position N+1 is left-justified, a state occurs in which for the adjacent two pixels, both the pulses generated by the PWM processing unit 150 and the light beams irradiated by the light emission unit 170 onto the image carrier contact with each other. For example, such a state corresponds to the state illustrated in FIG. 12 (b).

Figure 13:
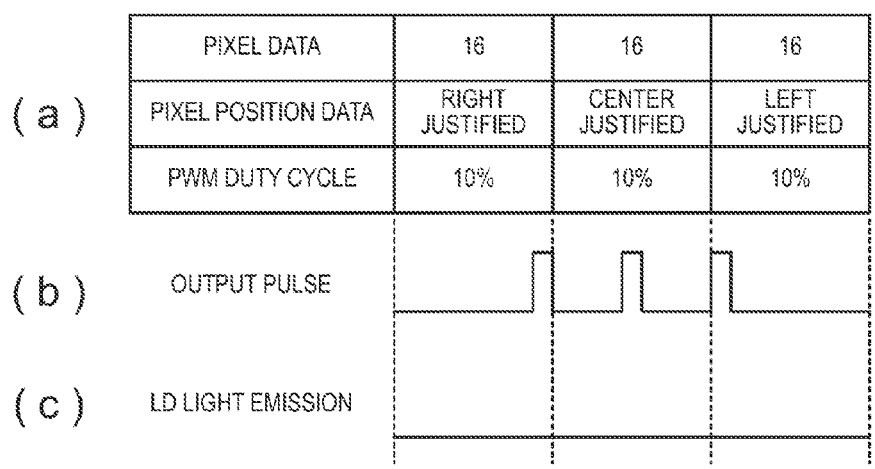
FIG. 13 is a view illustrating characteristics of the conventional image forming apparatus.

Meanwhile, in a pixel position state other than the above-described state (the pixel position data at the pixel position N is right-justified and the pixel position data at the pixel position N+1 is left-justified), there occurs a state in which for the adjacent two pixels, neither the pulses generated by the PWM processing unit 150 nor the light beams irradiated by the light emission unit 170 onto the image carrier contact with each other. For example, such a state corresponds to either one of the states illustrated in FIG. 13 (b).

When it is determined by the position determination unit 130 that adjacent two pixels including a pixel of interest do not contact with each other (NO at step S105 in FIG. 2), the first look-up table 155a for non-contacting pixels is selected by the table selection unit 156 (step S106 in FIG. 2). Further, when it is determined by the position determination unit 130 that adjacent two pixels including a pixel of interest contact with each other (YES at step S105 in FIG. 2), the second look-up table 155b for contacting pixels is selected by the table selection unit 156 (step S107 in FIG. 2).

The first look-up table 155a is a look-up table in which when adjacent two pixels including a pixel of interest are in non-contact with each other, pixel data is converted to a PWM duty cycle without entering a non-light-emitting state even in a low density region.

The second look-up table 155b is a look-up table in which when adjacent two pixels including a pixel of interest contact with each other, pixel data is converted to a PWM duty cycle without entering a non-light-emitting state even in a low density region.

Further, the first look-up table 155a and the second look-up table 155b are look-up tables in which irrespective of whether adjacent two pixels are in contact or in non-contact with each other, without causing a tone jump (refer to FIGS. 12 and 13) in a low density region, pixel data is converted to a PWM duty cycle so that light emission corresponding to the pixel value is enabled to take place even in a low density region.

Hereinafter, referring to FIG. 4, description will be made of the characteristics of the first look-up table 155a and the second look-up table 155b based on FIG. 3.

Figure 3:
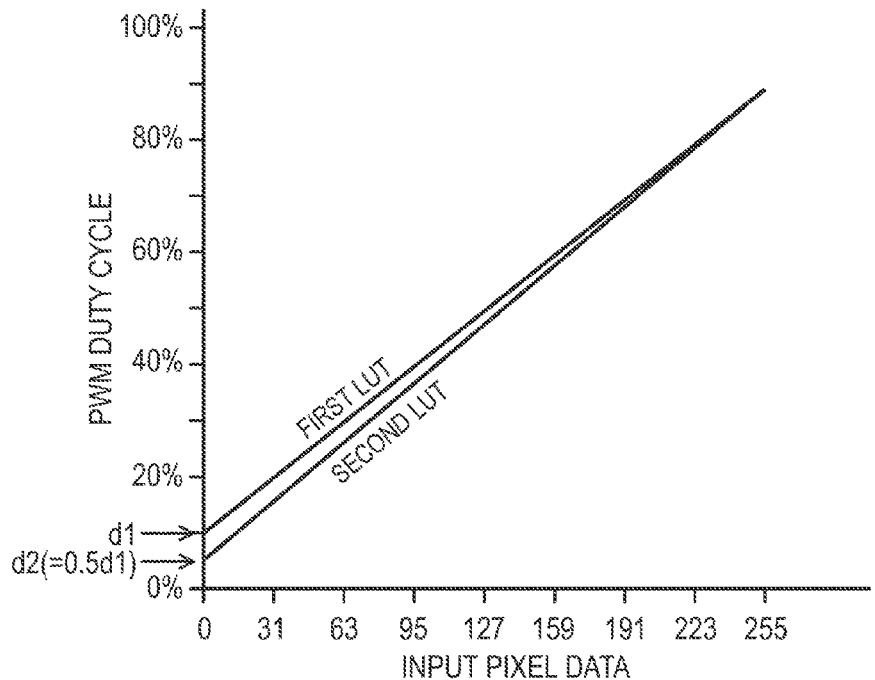
FIG. 3 is a view illustrating characteristics of the image forming apparatus according to the first embodiment of the present invention.

FIG. 3 is a characteristic view illustrating a relationship between pixel data and a PWM duty cycle of a pulse width signal generated at the PWM processing unit 150. The characteristics illustrated in FIG. 3 are characteristics (pixel data-PWM duty cycle conversion characteristics) stored in the first look-up table 155a and the second look-up table 155b. For the pixel data on the horizontal axis, a case is illustrated in which there are 256 steps, i.e., 0-255, but this is by way of example, and other numerical values may be adopted.

The PWM duty cycle is regarded as being 100% when the pulse is equal to the range of one pixel, and varies depending on resolution, but it is identical in meaning to pulse width.

Figure 4:
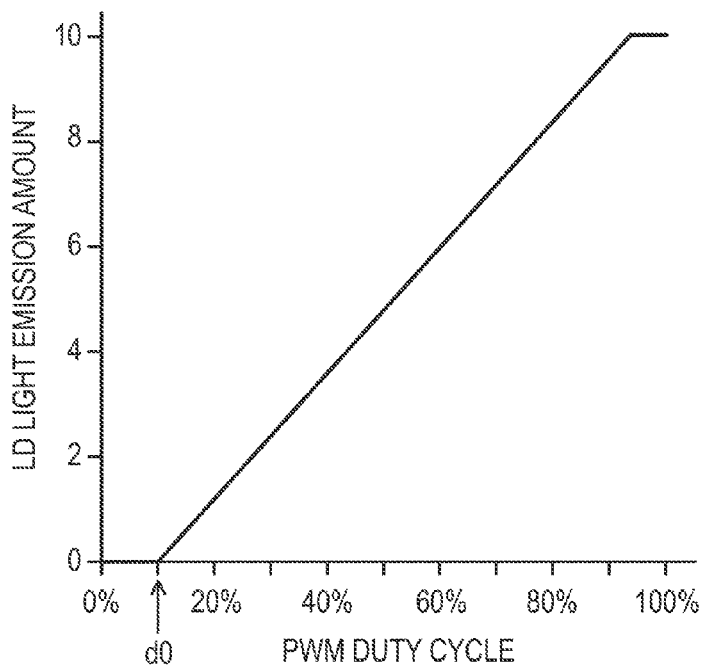
FIG. 4 is a view illustrating characteristics of the image forming apparatus according to the first embodiment of the present invention.

FIG. 4 is a characteristic view illustrating an example of the relationship between the PWM duty cycle (0%-100% (ratio at which the pulse becomes ON in the range of one pixel)) of a pulse width signal generated by the PWM processing unit 150 and the LD light emission amount (relative indication at 10 steps, i.e., 0-10, wherein 0 is non-light emission, and 10 is maximum light emission amount) of the light emission unit 170.

In the characteristic of FIG. 4, the LD light emission amount becomes 0 (zero) when the PWM duty cycle becomes equal to or lower than 10% (d0 in FIG. 4). Meanwhile, the LD light emission amount is saturated when the PWM duty cycle is about 95%.

For the characteristic (First LUT in FIG. 3) of the first look-up table 155a in which adjacent two pixels are in non-contact with each other, the PWM duty cycle d1 (vertical axis in FIG. 3) when the pixel value is 0 (horizontal axis in FIG. 3) is set to be equal to d0 in FIG. 4 in order to avoid a non-light emission state of the light emission unit 170 at a low density. In this manner, it is possible to avoid a non-light emission state since a minimum LD light emission amount can be obtained even when the pixel data is at a minimum value greater than 0.

Meanwhile, for the characteristic (Second LUT in FIG. 3) of the second look-up table 155b in which adjacent two pixels are in contact with each other, the PWM duty cycle d2 (vertical axis in FIG. 3) when the pixel value is 0 (horizontal axis in FIG. 3) is set to be ½ of d1, by taking into account of the contact of the adjacent two pixels, in order to avoid a non-light emission state of the light emission unit 170 at a low density and a tone jump. In this manner, since a minimum LD light emission amount can be obtained when the pixel data is at a minimum value greater than 0 and the adjacent two pixels contact with each other and merge into a single pulse, it is possible to avoid not only a non-light emission state but also a tone jump with respect to the non-contact of the adjacent two pixels.

Figure 5:
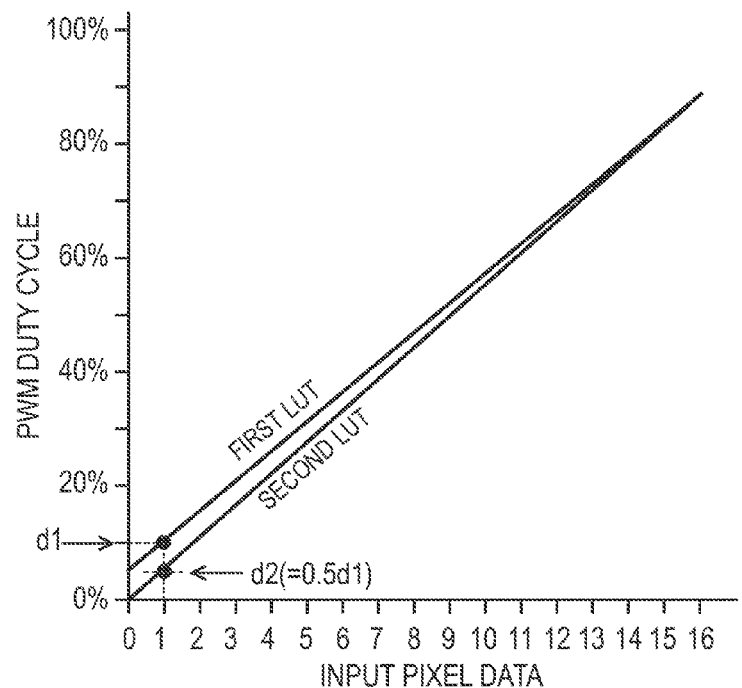
FIG. 5 is a view illustrating characteristics of the image forming apparatus according to the first embodiment of the present invention.

Further, the characteristic of the look-up table may also be made as illustrated in FIG. 5. For example, for the characteristic (First LUT in FIG. 5) of the first look-up table 155a in which the adjacent two pixels are in non-contact with each other, the PWM duty cycle d1 (vertical axis in FIG. 5) when the pixel value is 1 (horizontal axis in FIG. 5) is set to be slightly greater than d0 of FIG. 4 in order to avoid a non-light emission state of the light emission unit 170 at a low density. In this manner, it is possible to avoid a non-light emission state since a minimum LD light emission amount can be obtained even when the pixel data is 1.

Meanwhile, for the characteristic (Second LUT in FIG. 5) of the second look-up table 155b in which the adjacent two pixels are in contact with each other, the PWM duty cycle d2 (vertical axis in FIG. 5) when the pixel value is 1 (horizontal axis in FIG. 5) is set to be ½ of d1, by taking into account of the contact of the adjacent two pixels, in order to avoid a non-light emission state of the light emission unit 170 at a low density and a tone jump. In this manner, since a minimum LD light emission amount can be obtained when the pixel data is 1 and the adjacent two pixels contact with each other and merge into a single pulse, it is possible to avoid a non-light emission state and a tone jump with respect to the non-contact state of the adjacent two pixels.

In the characteristics of the first look-up table 155a and the second look-up table 155b in FIGS. 3 and 5, a maximum value for the pixel data and a maximum value for the PWM duty cycle may be determined based on a maximum value (saturation value) for the LD light emission amount.

The pulse width determination unit 151 converts the pixel data to the PWM duty cycle using the first look-up table 155a or the second look-up table 155b selected by the table selection unit 156 as above. Then, based on the pulse duty cycle determined by the pulse width determination unit 151 and the pixel position data from the image processing unit 120, the pulse generation unit 152 generates and supplies to the LD drive unit 160 a pulse width signal at the pixel position corresponding to the pixel position data and having a pulse duty cycle corresponding to the pixel data (step S108 in FIG. 2).

The generation of a pulse width signal as above is repeated from N=1 to N=Nmax in the main scanning direction (steps S109, S110, S104 and onward in FIG. 2), and similar processing is repeated per line in the sub-scanning direction (Steps S110, S111, S112, S104 and onward in FIG. 2).

A specific example of the case in which an operation is performed according to the above embodiment will be described using FIGS. 6 and 7.

Figure 6:
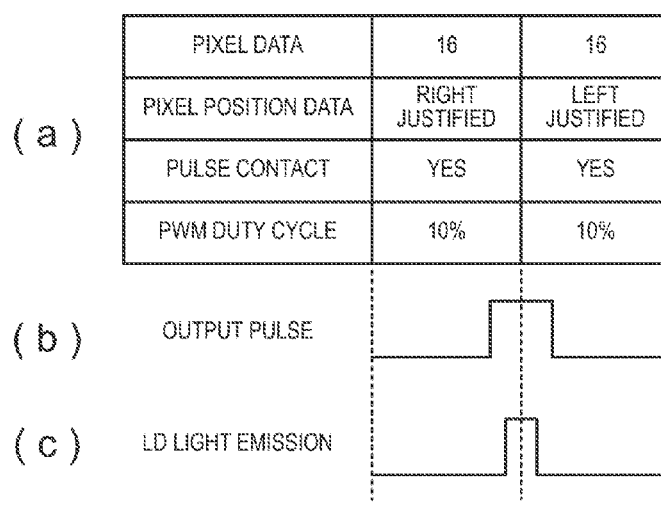
FIG. 6 is a view illustrating characteristics of the image forming apparatus according to the first embodiment of the present invention.
Figure 7:
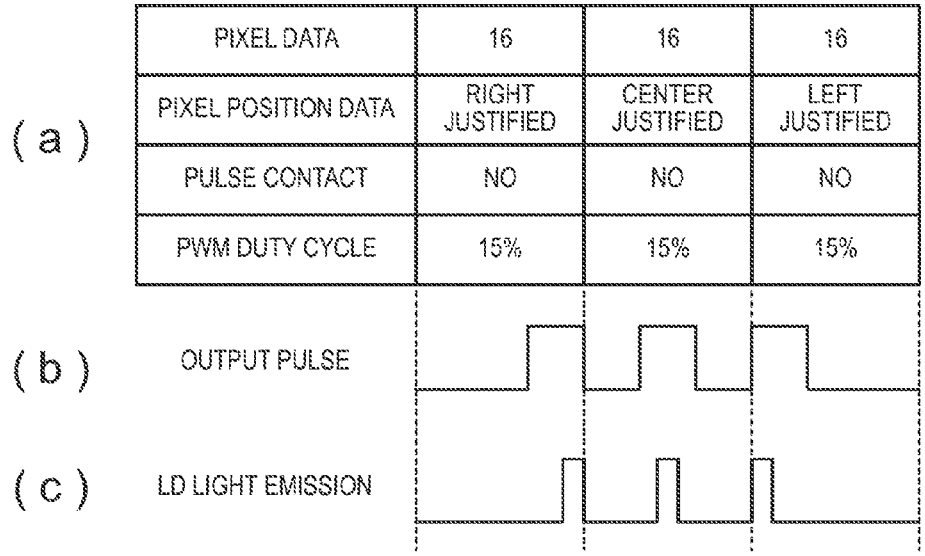
FIG. 7 is a view illustrating characteristics of the image forming apparatus according to the first embodiment of the present invention.

FIGS. 6 and 7 illustrate pixel data, pixel position data, a pulse width (PWM duty cycle) generated based on the pixel data, an output pulse shape, and a LD light emission state for adjacent two pixels in the main scanning direction.

When a left justified pixel and a right justified pixel contact with each other as in FIG. 6, the second look-up table 155b is selected, and a PWM duty cycle of 10% corresponding to the pixel data=16 is obtained. In other words, the PWM duty cycle is 10%+10%, and an LD light emission amount corresponding to the PWM duty cycle of a total of 20% is generated (FIG. 6 (b), (c)).

Meanwhile, in FIG. 7, three pixels, i.e., a right justified pixel, a center justified pixel, and a left justified pixel are present independently without contacting with each other. In this instance, since the three pixels are not in contact with each other, the first look-up table 155a is selected, and a PWM duty cycle of 15% corresponding to the pixel data=16 is obtained for each of them. Due to the pixel data being the same and the non-contact of the pixels, a greater PWM duty cycle is obtained than when the pixels are in contact with each other. In other words, there are generated three LD light emission amounts corresponding to PWM duty cycles of 15%, 15%, and 15% (FIG. 7 (b), (c)).

In other words, a comparison of the case in which light is emitted with the pixel data being 16+16 (FIG. 6 (c)) and the case in which light is emitted with the pixel data being 16+16+16 (FIG. 7 (c)) indicates that it is possible to emit laser light corresponding to the pulse without causing tone jump to occur between the pixel data and the light emission amount.

[Apparatus Configuration (2) of the Embodiment]

Figure 8:
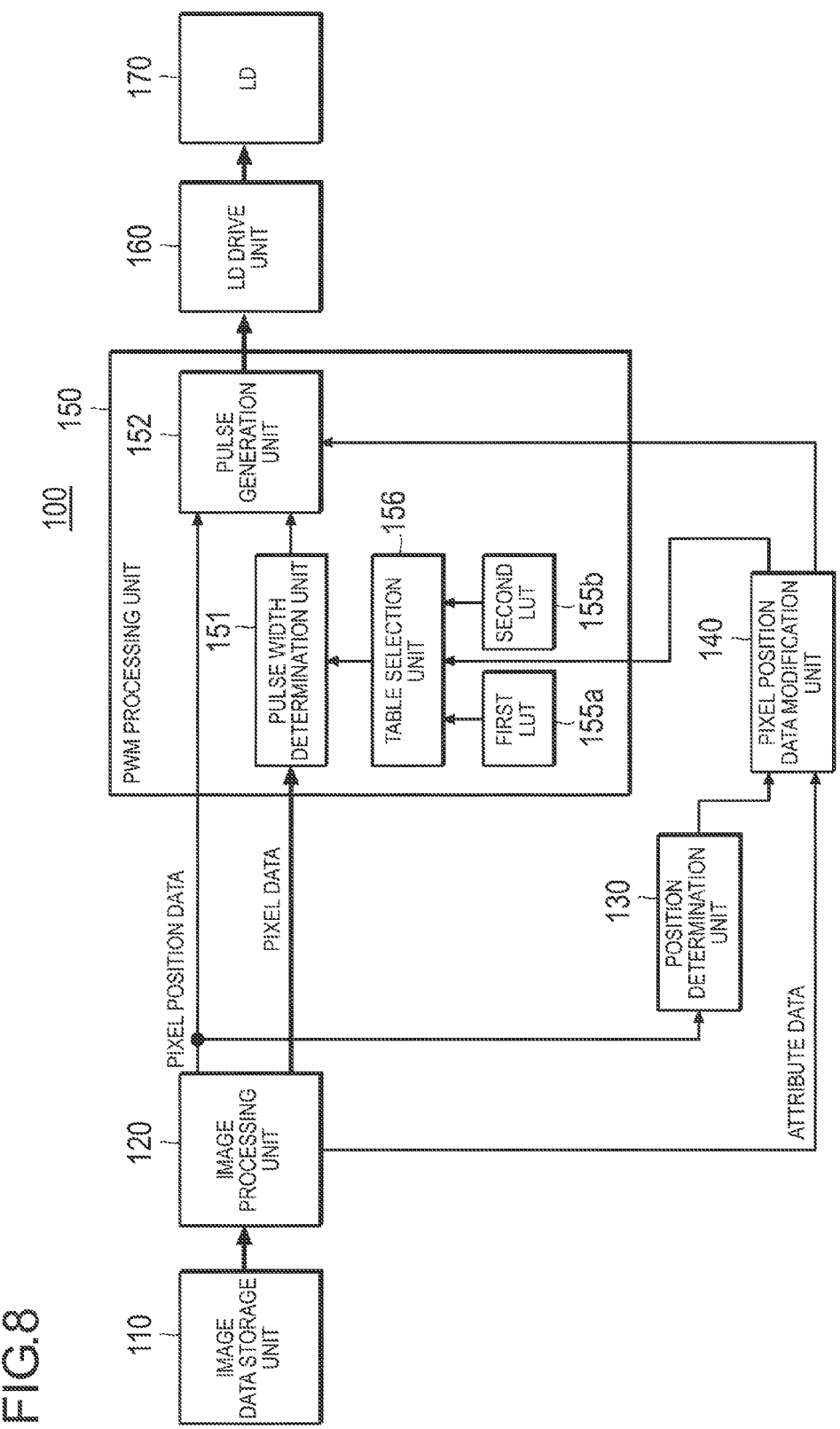
FIG. 8 is an explanatory diagram illustrating the configuration of a major part of an image forming apparatus according to a second embodiment of the present invention.

In FIG. 8, there is illustrated the configuration of a major part of an image forming apparatus 100 according to a second embodiment. The same components as those of FIG. 1 are assigned the same reference numerals, and an overlapping description is omitted.

The part different from FIG. 1 is configured by including a pixel position data modification unit 140.

The pixel position data modification unit 140 outputs pixel position data as modified (modified pixel position data) responsive to receipt of attribute data (character attribute/photo attribute) from the image processing unit 120 and a determination result (contact/non-contact) of the position determination unit 130.

When it is determined that pulse width signals of adjacent two pixels contact with each other, and when the attribute of the pixel data is a predetermined condition (e.g., photo attribute), responsive to receipt of attribute data (character attribute/photo attribute) from the image processing unit 120 and a determination result (contact/non-contact) of the position determination unit 130, the pixel position data modification unit 140 provides the pulse generation unit 152 with an instruction to finely adjust the position of at least one of the pulse width signals of the two pixels so as to prevent the pulse width signals from contacting with each other, and also provides the table selection unit 156 with a determination result of non-contact, as the pulse width signals of the two pixels do not contact with each other Under conditions other than "when it is determined that pulse width signals of adjacent two pixels contact with each other, and when the attribute of the pixel data is a predetermined condition (e.g., photo attribute)", i.e., when it is determined that the pulse width signals of the adjacent two pixels are in non-contact with each other or when the attribute of the pixel data is other than the predetermined condition (e.g., character attribute), the pixel position data modification unit 140 assumes a through state, and the same operation as in the first embodiment is performed.

[Operation (2) of the Embodiment]

In the following, description will be made of an operation (2) of the image forming apparatus 100 according to the present embodiment with reference to the flow chart of FIG. 9 and the characteristic views of FIG. 10 and succeeding figures. In the flow chart of FIG. 9, the same processes as in the flow chart of FIG. 2 are assigned the same step numbers, and an overlapping description is omitted.

In the following, description will be made focusing on the parts in the flow chart of FIG. 9 which are different from those in the flow chart of FIG. 2.

Let it be assumed here that as attribute data, there exists information of photo attribute and character attribute. The character attribute refers to an attribute about an image, such as character and line drawing, in which no importance is placed on tone. Further, the photo attribute refers to an attribute about an image, such as a photo image, in which importance is placed on tone.

When it is determined by the position determination unit 130 that adjacent two pixels including a pixel of interest do not contact with each other (NO at step S105a in FIG. 9), the first look-up table 155a for non-contacting pixels is selected by the table selection unit 156 (step S106 in FIG. 9).

Further, when it is determined by the position determination unit 130 that adjacent two pixels including a pixel of interest contact with each other (YES at step S105a in FIG. 9), and when attribute information from the image processing unit 120 is a character attribute (NO at step S105b in FIG. 9), the second look-up table 155b for contacting pixels is selected by the table selection unit 156 (step S107 in FIG. 9).

Meanwhile, when it is determined by the position determination unit 130 that adjacent two pixels including a pixel of interest contact with each other (YES at step S105a in FIG. 9), and when attribute information from the image processing unit 120 is a photo attribute (YES at step S105b in FIG. 9), the pixel position data modification unit 140 provides the pulse generation unit 152 with an instruction to finely adjust the position of at least one of the pulse width signals of the two pixels so as to prevent the pulse width signals from contacting with each other, and also provides the table selection unit 156 with a determination result of non-contact, as the pulse width signals of the two pixels do not contact with each other (step S105c in FIG. 9). In this instance, the second look-up table 155b for contacting pixels is selected by the table selection unit 156 (step S107 in FIG. 9).

Using FIGS. 10 and 11, description will be made of a specific example of a case in which an operation is performed according to the embodiment as above. Meanwhile, the description will be made as to when it is determined by the position determination unit 130 that adjacent two pixels including a pixel of interest contact with each other (YES at step S105a in FIG. 9), and when the attribute information from the image processing unit 120 is a photo attribute (YES at step S105b in FIG. 9).

FIG. 10 illustrates pixel data, pixel position data and a pulse width (PWM duty cycle) that is generated based on the pixel data for two pixels that are adjacent to each other in the main scanning direction. FIG. 7 illustrates an output pulse shape (before and after being modified) and a LD light emission situation for two pixels that are adjacent to each other in the main scanning direction.

FIG. 10(a) illustrates, for the case of character attribute, a case in which the pixel data for the adjacent two pixels are 16, and pulse contact exists due to right and left justification, wherein the second look-up table 155b is selected, and the PWM duty cycles become 10% and 10%. The output pulse for this case becomes as in FIG. 11(a).

Meanwhile, FIG. 10(b) illustrates, for the case of photo attribute, a case in which the pixel data of the adjacent two pixels are 16, and the state in which contact exists due to right and left justification is turned into a state in which modifications are made such as right justification (right non-contact fine adjustment) and left justification (left non-contact fine adjustment), wherein the first look-up table 155a is selected, and the PWM duty cycles become 15% and 15%. The output pulse for this case becomes as in FIG. 11(b) in which a space occurs between two pulses. Further, the LD light emission for this case becomes composed of two emitted lights which approach but do not contact with each other as in FIG. 11 (c).

In this instance, in addition to the effects (of avoiding a tone jump and achieving a low density tone) obtained according to the first embodiment, it is possible to avoid a phenomenon, in which when pixels have a photo attribute, the original two pixels are combined into a single pixel so that the resolution is lowered; thus, it becomes possible to display the original two pixels as two pixels, while also maintaining the effect of the pixel position control.

In other words, for a photo image, even when the pixel position control is performed, it is possible to maintain the resolution by providing a space between the adjacent two pixels to prevent the adjacent two pixels from contacting with each other. Further, for a character image, by performing the pixel position control to cause the adjacent two pixels to contact with each other so that a continuous line is image-formed, it becomes possible to keep the continuity of the line.

[Other Embodiment (1)]

Further, while the above embodiment is suitable for use with an electrophotographic image forming apparatus using laser light, in addition thereto, various embodiments of the present invention is applicable to various types of image forming apparatus, such as a laser imager in which light exposure is performed with respect to a photographic paper using laser light; thus, it is possible to achieve a satisfactory result.

Further, the embodiments of the present invention are also applicable in a case in which a light source other than laser diode (LD) is used as the light source.

[Other Embodiment (2)]

In the foregoing, it has been described by way of example that a plurality of look-up tables (the first look-up table 155a and the second look-up table 155b) are switched, but there is no limitation thereto.

For example, also by preparing a plurality of formulas for calculating the PWM duty cycle from the pixel data, it is possible to achieve similar advantages.

Further, also by preparing a plurality of formulas for correction for the basic formulas for calculating the PWM duty cycle from the pixel data, it is possible to achieve similar advantages.

Further, also by preparing a plurality of look-up tables for correction for the basic formulas for calculating the PWM duty cycle from the pixel data, it is possible to achieve similar advantages.

Further, also by preparing a plurality of formulas for correction for the basic look-up tables for calculating the PWM duty cycle from the pixel data, it is possible to achieve similar advantages.

As above, according to the image forming apparatus reflecting an aspect of the present invention, when, based on pixel data for each pixel included in the image data, laser light having a pulse width corresponding to the pixel data is irradiated while scanning to an image carrier to form, on the image carrier, an image in which the density tone is reproduced, it is determined whether pulse width signals of adjacent two pixels are caused to contact with each other by pixel position control, and the pulse widths of the pulse width signals are corrected to different values depending on whether the pulse width signals of the adjacent two pixels contact with each other.

Consequently, when performing image formation with laser light generated from a pulse with pixel position control, it becomes possible to generate laser light corresponding to the pulse without causing occurrence of a tone jump between the pixel data and the light emission amount.

Further, depending on whether the pulse width signals of the adjacent two pixels contact with each other, the image forming apparatus corrects the pulse widths of the pulse width signals to different values using the first look-up table that converts the pixel data to pulse widths when the pulse width signals of the adjacent two pixels do not contact with each other and the second look-up table that convert the pixel data to pulse widths when the pulse width signals of the adjacent two pixels contact with each other.

Consequently, when performing image formation with laser light generated from a pulse with pixel position control, it is possible to correct the pulse widths of the pulse width signals to different values by switching use between the first look-up table and the second look-up table, and thus it becomes possible to generate laser light corresponding to the pulse without causing occurrence of a tone jump between the pixel data and the light emission amount.

Further, in at least one of the cases in which the pulse width signals of the adjacent two pixels contact with each other and in which such signals do not contact with each other, the image forming apparatus determines the pulse widths of the pulse width signals by performing addition or subtraction so as to correct the pulse widths to different values.

Consequently, when performing image formation with laser light generated from a pulse with pixel position control, it is possible to correct the pulse widths of the pulse width signals to different values by addition or subtraction, and thus it becomes possible to generate laser light corresponding to the pulse without causing occurrence of a tone jump between the pixel data and the light emission amount.

Further, when it is determined that the pulse width signals of the adjacent two pixels contact with each other, and when the attribute of the pixel data is a predetermined condition, the image forming apparatus adjusts the position of at least one of the pulse width signals of the two pixels so as to prevent the pulse width signals from contacting with each other, so that each of the pulse widths is determined, as the pulse width signals of the two pixels do not contact with each other.

A pertinent attribute of the pixel data is character/photo or the like. In other words, for a photo image, even when pixel position control is performed, it becomes possible to maintain the resolution without causing the adjacent two pixels to contact with each other. Further, for a character image, by performing the pixel position control to cause the adjacent two pixels to contact with each other so that a continuous line is image-formed, it becomes possible to keep the continuity of the line.

What is claimed is:

1. An image forming apparatus in which based on pixel data for each pixel included in image data, laser light having a pulse width corresponding to the pixel data is irradiated while scanning to an image carrier, thereby forming on the image carrier an image in which density tone is reproduced, the image forming apparatus comprising:
an image processing unit that outputs for each pixel, together with the pixel data, pixel position data which adjusts an irradiation position for each pixel of the laser light on the image carrier in a range of one pixel in a scanning direction;
a PWM processing unit that generates, for the each pixel, a pulse width signal at a pixel position corresponding to the pixel position data and having a pulse width corresponding to the pixel data;
a light emission drive unit that drives light emission of a laser diode based on the pulse width signal generated by the PWM processing unit, thereby generating the laser light; and
a position determination unit that determines, via the adjustment by the pixel position data, whether the pulse width signals of adjacent two pixels contact with each other,
wherein by referring to a result of the determination by the position determination unit, the PWM processing unit corrects the pulse widths of the pulse width signals to different values depending on whether the pulse width signals of the adjacent two pixels contact with each other.

2. The image forming apparatus according to claim 1, wherein the PWM processing unit is configured by comprising:
   a first look-up table that converts the pixel data to the pulse widths when the pulse width signals of the adjacent two pixels do not contact with each other; and
   a second look-up table that converts the pixel data to the pulse widths when the pulse width signals of the adjacent two pixels contact with each other.

3. The image forming apparatus according to claim 1, wherein in at least one of cases in which the pulse width signals of the adjacent two pixels contact with each other and in which the pulse width signals of the adjacent two pixels do not contact with each other, the PWM processing unit determines the pulse widths by performing addition or subtraction so as to correct the pulse widths of the pulse width signal to different values.

4. The image forming apparatus according to claim 1, wherein when it is determined by the position determination unit that the pulse width signals of the adjacent two pixels contact with each other, and when an attribute of the pixel data is a predetermined condition, the PWM processing unit adjusts the position of at least one of the pulse width signals of the two pixels such that the pulse width signals do not contact with each other so that each of the pulse widths is determined as the pulse width signals of the two pixels do not contact with each other.

5. The image forming apparatus according to claim 4, wherein:
   the attribute includes a character/photo attribute; and
   the predetermined condition is a condition that the attribute is photo attribute.

6. The image forming apparatus according to claim 1, wherein the different values are larger values than the pulse widths before the correction to cause the laser light to be generated when the adjacent two pixels do not contact one another.

* * * * *